United States Patent [19]

Ahmad

[11] Patent Number: 4,696,647
[45] Date of Patent: Sep. 29, 1987

[54] ELECTRONIC ASSEMBLY TOY

[76] Inventor: Shamoon Ahmad, 829 A. Donaldson Ave., Highland Park, N.J. 08904

[21] Appl. No.: 831,187

[22] Filed: Feb. 20, 1986

[51] Int. Cl.[4] ............................................. G09B 19/00
[52] U.S. Cl. ..................................................... 434/224
[58] Field of Search .......................................... 434/224

[56] References Cited

U.S. PATENT DOCUMENTS 3,447,249  6/1969  Greger .................................. 434/224
3,576,936  5/1971  Fischer ................................. 434/224
4,376,538  3/1983  Keenan ................................. 434/224

Primary Examiner—Leo P. Picard

[57] ABSTRACT

An apparatus designed to have a pre-wired base plate with various openings for insertion of blocks containing components. Upon insertion of the blocks in the proper openings of the base plate the total assembly may be used as a calculator, radio, intercom, clock or other electronic toy device depending upon the base plate and the placement of the block containing components.

4 Claims, 10 Drawing Figures

ELECTRONIC ASSEMBLY TOY

BACKGROUND OF THE INVENTION

While there have been many other apparatus manufactured wherein a person skilled or semi-skilled or in the electronic field may purchase kits for the manufacture of various electronic components or assemblies, there have been no toy devices for younger less skilled persons. In addition, in the past, the assembly of all the components in the proper series required a great deal of skill and patience in the following instruction. These devices, however, where not capable of being put together by young children especially children unfamiliar with electronic terms or components. Further, assembly of electronic components in the past, to form either a radio, TV, or calculator, required the one assembling the unit to have various special tools to assembly the device being made.

It is therefore an object of this invention to produce an electronic assembly toy unit that requires no tools or manufacture, just the insertion of blocks containing components into a base plate.

A further object is to provide an electronic assembly toy that upon completion is a working unit giving the person or child assembling it a sense of accomplishment.

A still further object is to have some of the electronic components visible and named so that the person putting together the device learns to understand what certain electronic components are and what they look like.

SUMMARY OF THE INVENTION

A box shaped base plate, which has a very thin rectangular top section designed to have slots or depressions to house various blocks. Each of the blocks, it is designed to house, contains a model of a non-working real electronic component, a number or a math function, with the wiring or activating portion of the block merely performing as a jump wire or activator so that when the base plate is fully assembled, with all the blocks inserted the circuit and the base plate is complete. You then have a working device. The blocks which are transparent contain an actual non-working electronic component, inside the transparent block, number or math symbol, at the bottom of the block. It also has a named designation, on the block, identifying the electronic component contained within. The wiring of the block and the base plate are such that, the block is the male component of the connection and the base plate depression is the female portion of the connection. The blocks are of four (4) types, the first type being a control block or a block that actually functions and the device contained within the block can be manipulated after the insertion into the base plate to provide control of the device being assembled, by manual manipulations of the component contained within the control block.

The second sets of blocks are the display blocks which have non-working but actual looking electronic components contained within them, they provide no control function.

The third are number blocks that activate a number function when depressed into the base plate.

The fourth are math symbol blocks which activate a math function or sequence upon being depressed into the base plate.

The purpose of the display block is to show the size, shape and general configuration of various electronic components. Upon all the display blocks being put into their proper depressions in the base plate, said blocks, together with the base plate form a working device and the control system for the device. The non-working blocks function only as jump wires connectors between two connections of each slot of the base plate when plugged into the proper slot to form a completed circuit so that current may flow from the power source through the device. While the actual components, that are encased in these blocks, do not function, they look and are identified as the electronic component that would be needed in this portion of the toy device to properly complete the circuit.

With reference to the number and math symbol blocks they complete the circuit by depressing them into the base plate without the need of jump wire connectors.

The power source could be a battery or low-voltage transformer.

The base plate contains all the wiring and the actual electronic components for the device itself with the depression merely containing uncompleted circuits which upon insertion of the proper blocks completes the circuit and the device functions.

The blocks will be such that they have a raised portion at the base which can only be matted with the exact depressed portion of the base plate.

DETAILED DESCRIPTION OF THE PREFERRED EMBODIMENT OF THE INVENTION

Figure 1:
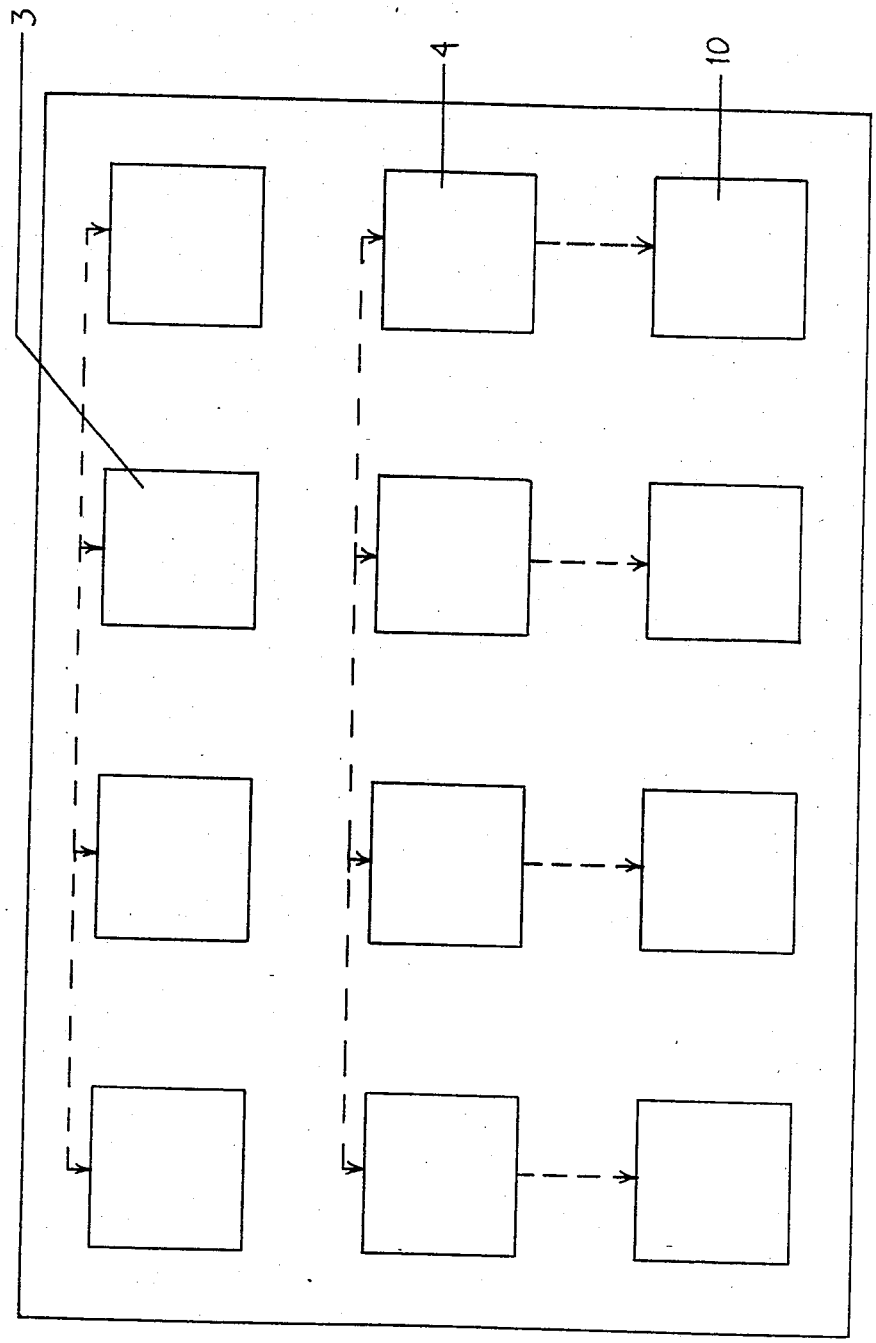
FIG. 1 is a top view of a base plate.
Figure 2:
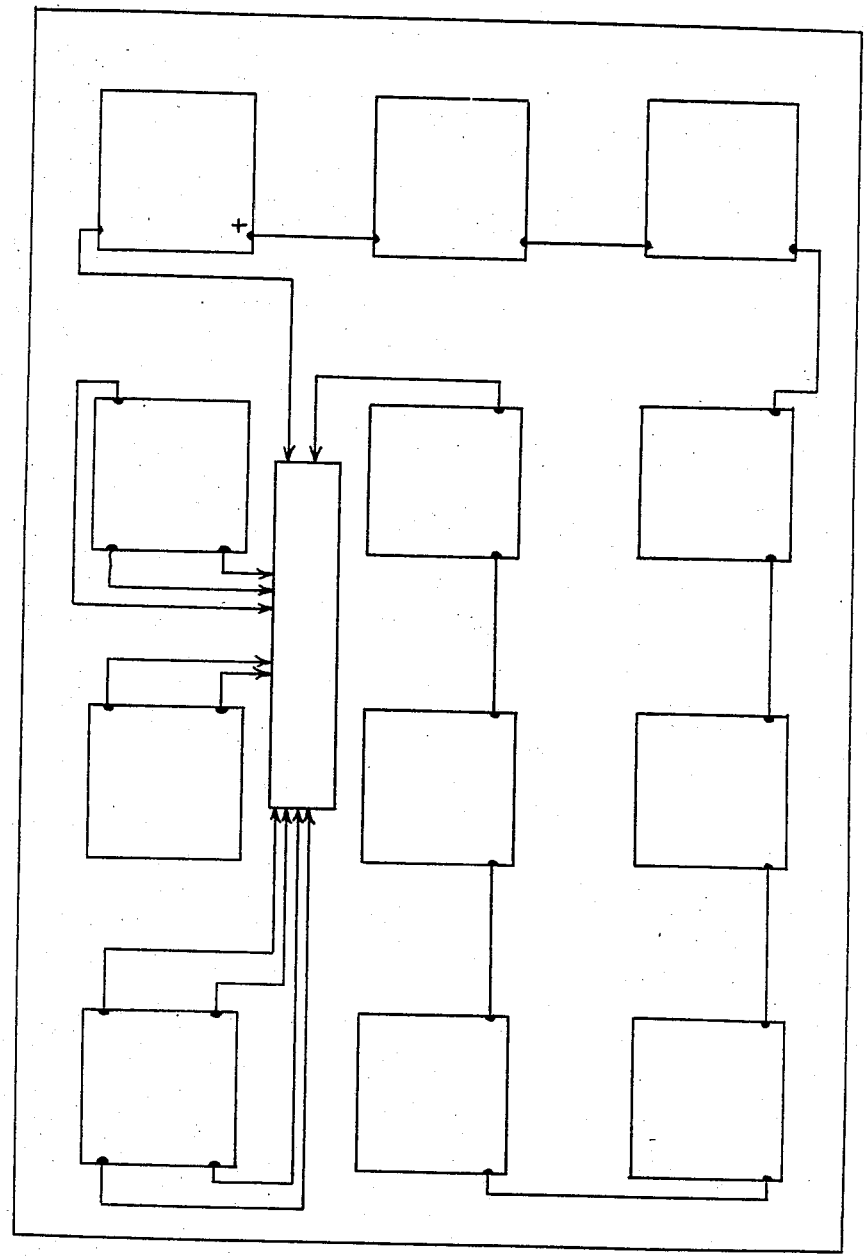
FIG. 2 is a top view of a base plate showing the slots for a radio.
Figure 3:
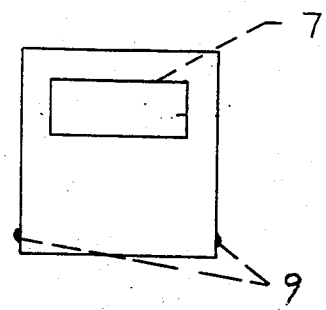
FIG. 3 is a front view of a block.
Figure 4:
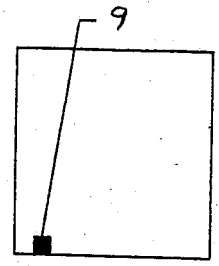
FIG. 4 is a side view of a block.
Figure 5:
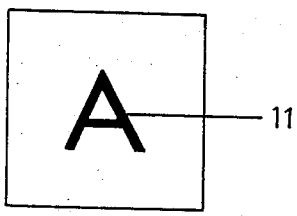
FIG. 5 is a bottom view of a block.
Figure 6:
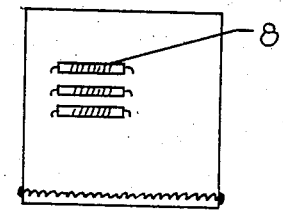
FIG. 6 is a top view of a block.
Figure 7:
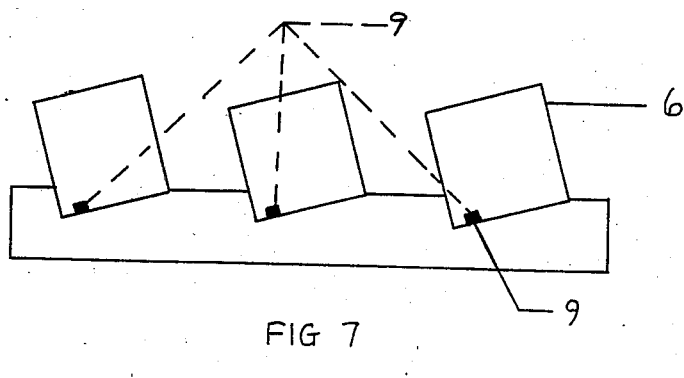
FIG. 7 is a side view of the blocks inserted in the base plate.
Figure 8:
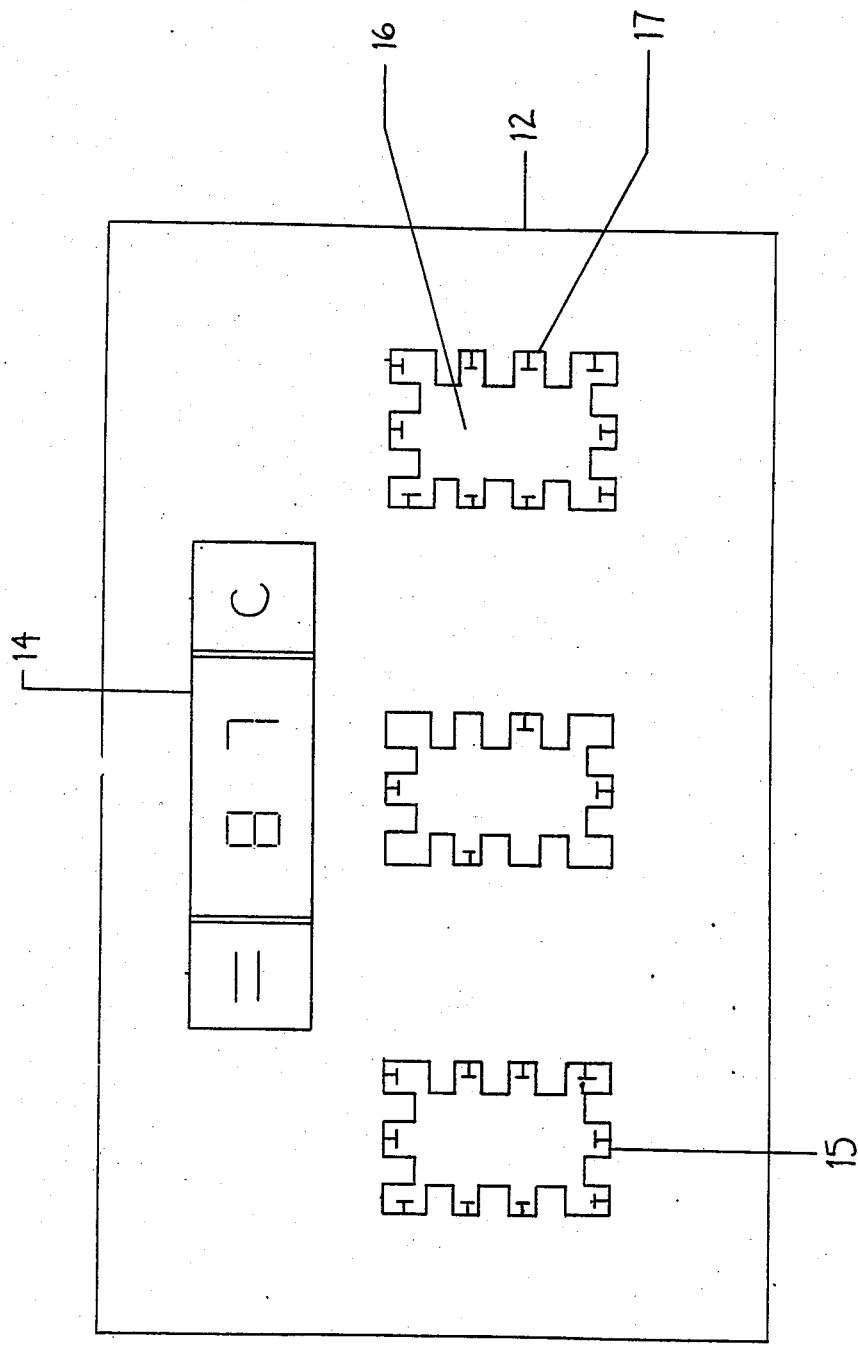
FIG. 8 is the base plate for a calculator.
Figure 9:
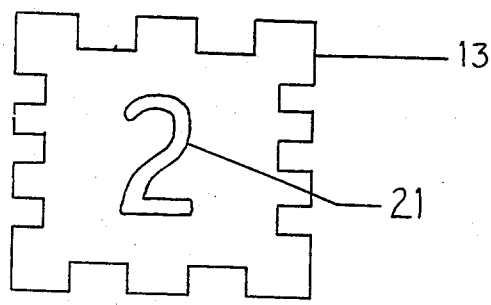
FIG. 9 is the top view of the blocks for the calculator.

Referring to FIG. 1 base plate 1 is shown having two sections of blocks which are designated as control slots 3 and display slots 4. The wiring of base plate 1 is not shown, however, base plate 1 may be wired to be a radio, clock, intercom or other electronic device with open connections 5 at each one of display slots 4 and the control slots 3. The device control slots 3 have inserted in them blocks 6 which have manually controllable devices within them for regulating certain functions for say a radio. The display blocks 6 also have electronic connectors 9 contained within them so that when blocks 6 are inserted in slots 4 a circuit is completed. Block 6 as shown in FIGS. 3 thru 6 have an identification name of the component 8 contained within clear block 6 as shown in FIG. 3, they also have a metal connector 9 such as a square piece of metal which goes through block 6 and makes contact with the two metal connectors 5 of base plate 1. Upon insertion of block 6 into the base plate 1 a circuit is complete, and upon insertion of all the blocks 6 in all the depressions 10 of base plate 1, a full circuit is complete making a working device. At the bottom of the block 6 is raised alphabet letter 11 or other design which is designed to fit only in the proper depression of the base plate 1, so that block 6 can only be inserted in one manner to make sure that the contact is properly made between the contacts 5 of the base plate 1 and contacts 9 of block 6 and that the circuit is completed. In FIG. 6, the block 6 is made of a transparent material to show the named component 7 which are exact duplicates of working components so that the child assembling the unit can identify the name of the component 7 shown in FIG. 3 with the size and shape of the component.

When the device to be manufactured, is to be a calculator, a different base plate 12 is used as well as different shaped blocks 13. This plate 12 has a permanent display window 14 for seeing the results of any calculations made with the device once it has been properly put together by the child. The blocks 13 in this device, unlike the prior device, contain no electronic components or wiring but merely activating raised portions on said blocks 13. In addition, they are hollow blocks 13 with all enclosed sides, their entire function is to depress the push buttons 15 of the base plate 12 which are located inside the depressions 16 of the base 12. The base plate 12 has only three depression portions for two numbered block 13 and one math function block 13. These depression portions accept two number blocks with both the number and math symbol blocks 13 having two short and one long raised portion on each side with the long raise section 20 being the activator and the short raised section 18 and 19 being arranged to mate with the depressions portion of the base plate in such a way that when properly inserted only the number portion 21 on the top side of the block 13 will be activated when block 13 is pushed to the bottom of plate 12. There is only one full length raised section 20 on each side of the block 13 for activating a function. The two shorter raised section 18 and 19 on each side of block 13 are only for the guidance of the block 13 when it is being pushed since only the longer trains 20 are capable of touching the bottom mechanism contained within the base plate 12. Therefore, each insertion of the block 13 only has with the capability of activating one number within the base plate 12 upon each push. In order for a person to use a different number or different math functions, a different block 13 must be inserted or the block 13 can be reversed since each block 13 is capable of activating two functions one function on its top section and one functions by its bottom section. Each block 13 has clearly printed on its top section and one function by its bottom section. Each block 13 has clearly printed on its top and bottom a number 21 or the math function it will activate in the calculator when said block 13 is depressed. The blocks 13 to be inserted in the center cavity unlike the other blocks has only four combinations these being addition, subtraction, multiplication and division with two functions on each block, so that one has to place the block 13 into the center of the base plate with the plus sign up to add and to subtract one merely removes the block turns it over with the minus facing up and again depresses to perform subtraction.

Figure 10:
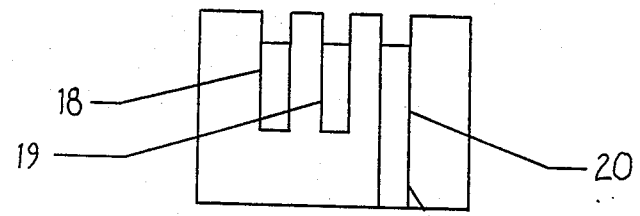
FIG. 10 is a side view of the blocks of the calculator.

It should be noted that as shown in the FIG. 10, each of the numbered blocks have a different combination of long and small raised sections so that there is no opportunity for the blocks to make improper contact with the bottom of the base plate.

I claim:

1. An electronic circuit educational device including,
   base means containing an electronic circuit with designed open circuits;
   said base means containing an electronic circuit with designed open circuits;
   said base means futher including a plurality of differently shaped slots physically located at each open circuit location;
   a plurality of eletronic component block means, certain of said means containing therein working electronic components, other of said block means containing non-working electronic components, said block means shaped to fit correspondingly shaped slots in said base means;
   whereby, when all said blocks have been inserted into their proper shaped slots, a working electronic device or circuit is obtained.

2. The electronic circuit educational device of claim 1 wherein said block means are sized and shaped exactly like the electronic component they are to represent.

3. The electronic circuit educational device of claim 2 wherein said non-working electronic component block means further include shorting means so as to electrically short the open circuit located in said shaped slots and said working component block means further includes conductor means to electrically connect said working component for operation when placed in the properly shaped slot.

4. The electronic circuit educational device of claim 2 wherein said working component block means further include switch means that alters the electronic circuit in said base when placed in the properly shaped slot.

* * * * *